(12) United States Patent
Hu et al.

(10) Patent No.: US 8,531,366 B2
(45) Date of Patent: Sep. 10, 2013

(54) LCD DRIVING DEVICE AND METHOD FOR DRIVING THE SAME

(75) Inventors: Ming Hu, Beijing (CN); Chuncheng Che, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 274 days.

(21) Appl. No.: 12/840,588

(22) Filed: Jul. 21, 2010

(65) Prior Publication Data

US 2011/0018846 A1 Jan. 27, 2011

(30) Foreign Application Priority Data

Jul. 22, 2009 (CN) .......................... 2009 1 0089752

(51) Int. Cl.
*G09G 3/36* (2006.01)

(52) U.S. Cl.
USPC ........................................... 345/87; 345/204

(58) Field of Classification Search
USPC .................................................. 345/87, 204
See application file for complete search history.

(56) References Cited

U.S. PATENT DOCUMENTS

| 5,602,560 | A | * | 2/1997 | Ikeda ............................... 345/94 |
| 6,124,840 | A | * | 9/2000 | Kwon ........................... 345/100 |
| 7,924,041 | B2 | * | 4/2011 | No et al. ................... 324/760.01 |
| 8,217,926 | B2 | * | 7/2012 | Meng ............................. 345/205 |
| 2002/0084968 | A1 | | 7/2002 | Park et al. |
| 2005/0024314 | A1 | * | 2/2005 | Lin et al. ......................... 345/98 |
| 2006/0044249 | A1 | | 3/2006 | Lee et al. |
| 2008/0122875 | A1 | * | 5/2008 | Qi .................................. 345/690 |
| 2008/0122876 | A1 | | 5/2008 | Meng et al. |

FOREIGN PATENT DOCUMENTS

| CN | 1363919 A | 8/2002 |
| CN | 1744189 A | 3/2006 |
| CN | 101192383 A | 6/2008 |

* cited by examiner

Primary Examiner — Kwang-Su Yang
(74) Attorney, Agent, or Firm — Ladas & Parry LLP

(57) ABSTRACT

A liquid crystal display driving device, comprising a scanning driving unit; a data driving unit; gate lines; data lines; pixel regions defined by the gate lines and the data lines; and a compensation circuit connected to the gate lines, wherein the gate lines include gate scanning lines and a redundant gate line, the data lines includes data signal lines and a redundant data line, and the compensation circuit is used to compensate the gate scanning signals of the gate scanning lines, so as to reduce voltage delay over the gate scanning lines.

7 Claims, 7 Drawing Sheets

LCD DRIVING DEVICE AND METHOD FOR DRIVING THE SAME

BACKGROUND

Embodiments of the invention relate to a LCD (liquid crystal display) driving device.

These days, TFT-LCDs (thin film transistor liquid crystal displays) have become the main flat panel displays and also have been developing towards large sizes and high resolutions. With the size of a TFT-LCD becoming ever larger, the gate scanning lines and the data signal lines in the TFT-LCD become ever longer. This gives rise to ever larger resistance of the gate scanning lines and the data signal lines; and higher resolution causes more intersecting and overlapping areas between the gate scanning lines and the data signal lines, which increases the parasitic capacitance for each signal line.

FIG. 1 is a schematic view showing the configuration of a conventional TFT liquid crystal display device. As shown in FIG. 1, across the pixel region of the TFT-LCD device, the horizontal gate scanning lines G and the vertical data signal lines D are arranged into a grid, each square in the grid represents a pixel, a thin film transistor T for controlling operation of the corresponding pixel is formed at each of intersections of the data signal lines D and the gate scanning lines G. Among these lines, the gate line preceding the first gate scanning line G is a redundant gate line (the gate line at the very top as shown in FIG. 1) for testing; and the data line succeeding the last data signal line D is a redundant data line (the data line at the very right as shown in FIG. 1) for testing. A data driving chip supplies data signals to the data signal lines D, through which the data signals are transferred to each pixel row in the pixel region. The gate driving chip controls the gate scanning lines G and supplies scanning signals to the gate scanning lines G row-by-row, so that the pixels in the pixel region can be switched on row-by-row through the thin film transistors, and thus the data signals from the data signal lines D can be transferred to pixels through the thin film transistors.

FIG. 2 is a schematic view showing the gate scanning signal outputted from the beginning of a gate scanning line (the portion of a gate scanning at the very left as shown in FIG. 1) of a conventional TFT-LCD. FIG. 3 is a schematic view showing the gate scanning signal outputted from the end of the gate scanning line (the portion of a gate scanning at the very right as shown in FIG. 1) of the conventional TFT-LCD. In the drawings, $G_n$ stands for the $n^{th}$ gate scanning line. As shown in FIG. 2, the pixels are scanned row by row (or line by line). A GOE (Gate Open Enable) slot is kept between the high levels of each pair of neighboring data scanning lines. The width of the GOE slot equals the time delay caused by the product RC of the resistance R of the gate signal lines and the parasitic capacitance C caused by the overlapping areas between the signal lines so as to avoid the problem of signal interfering due to the RC time delay. As shown in FIG. 3, the gate scanning signal output from the end of each gate scanning line deforms, mainly due to the RC time delay.

With a certain resolution and scanning frequency, pixels of each row have a fixed-value scanning time. However, if the RC time delay becomes larger, the GOE slot requires larger margin, which leads to shorter charging time for the pixels. When the RC time delay reaches a threshold, the gate scanning signal causes the charging efficiency not to meet the requirement, which adversely affect the display quality of a TFT-LCD. In the same time, as the RC time delay becomes larger, the gate scanning signal of each row has a longer descending curve when it drops from the high level to the low one; as a result, the pixels have different voltage offsets at the left and right ends in a TFT-LCD, which leads to inhomogeneous display quality and thus causes display flicking.

SUMMARY

An embodiment according to the invention provides a liquid crystal display driving device comprising: a scanning driving unit; a data driving unit; gate lines; data lines; pixel regions defined by the gate lines and the data lines; and a compensation circuit connected to the gate lines, wherein the gate lines include gate scanning lines and a redundant gate line, the data lines includes data signal lines and a redundant data line, and the compensation circuit is used to compensate the gate scanning signals of the gate scanning lines, so as to reduce voltage delay over the gate scanning lines.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Hereinafter, detailed description is given to the embodiments of the invention with references to the drawings.

An embodiment of the invention provides a liquid crystal driving device comprising a scanning driving unit, a data driving unit, gate lines, data lines, and pixel regions defined by the gate lines and the data lines, wherein the gate lines include gate scanning lines and a redundant gate line, and the data lines include data signal lines and a redundant data line.

The embodiment of the invention compensates the gate scanning signals through providing a compensation circuit to the ends of the gate scanning lines, so as to reduce the deficiencies such as unsatisfactory display effect and flickering due to the adverse effect of the RC time delay on the ascending and/or descending of the gate scanning signal, to improve the quality of displayed images, to improve the uniformity of the gate scanning signals, and to reduce the flickering of the displayed images caused by the RC time delay.

It is necessary to point out that the gate threshold voltage in the description refers to the voltage on a gate line that exactly has the thin film transistors (TFTs) in the corresponding row switched on and the pixels start charging; while Vgh refers to the voltage on a gate line when the TFTs are fully switched on and the pixels have been fully charged, and Vgl refers to the voltage on a gate line when the TFTs are fully switched off and the pixels have ceased charging.

Figure 1:
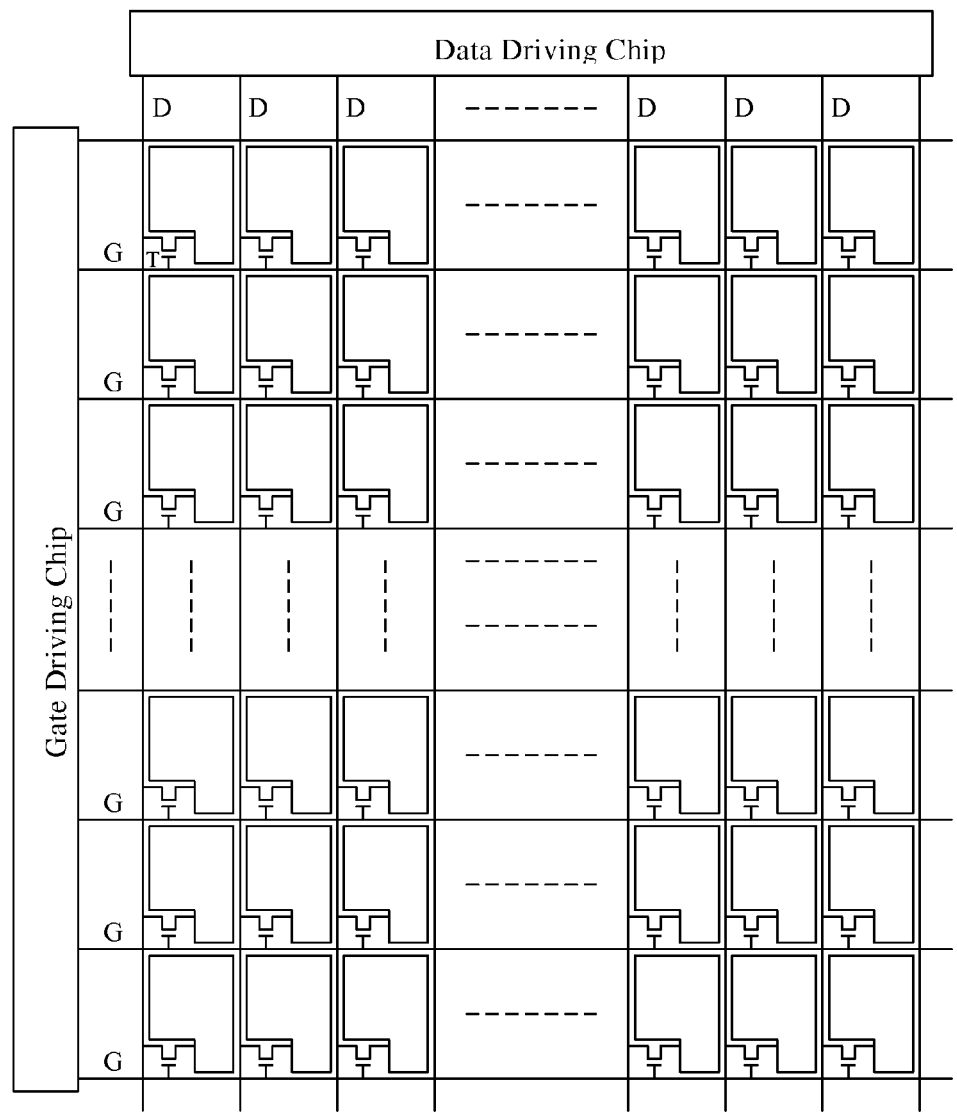
FIG. 1 is a schematic view showing the configuration of a conventional TFT-LCD device.
Figure 2:
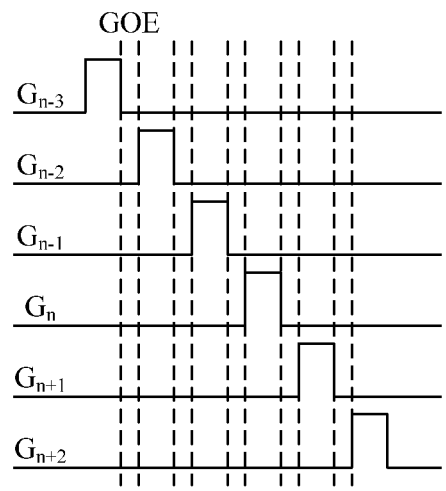
FIG. 2 is a schematic view showing the gate scanning signal outputted from the beginning of the gate scanning line of the conventional TFT-LCD.
Figure 3:
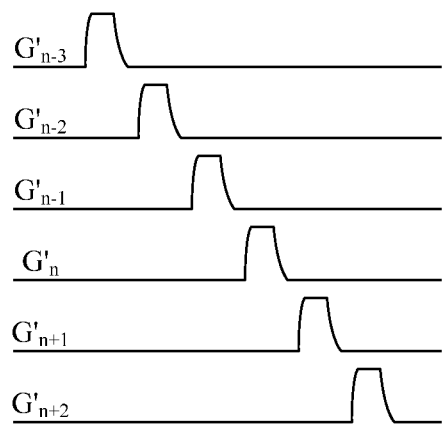
FIG. 3 is a schematic view showing the gate scanning signal outputted from the end of the gate scanning lines of the conventional TFT-LCD.
Figure 4:
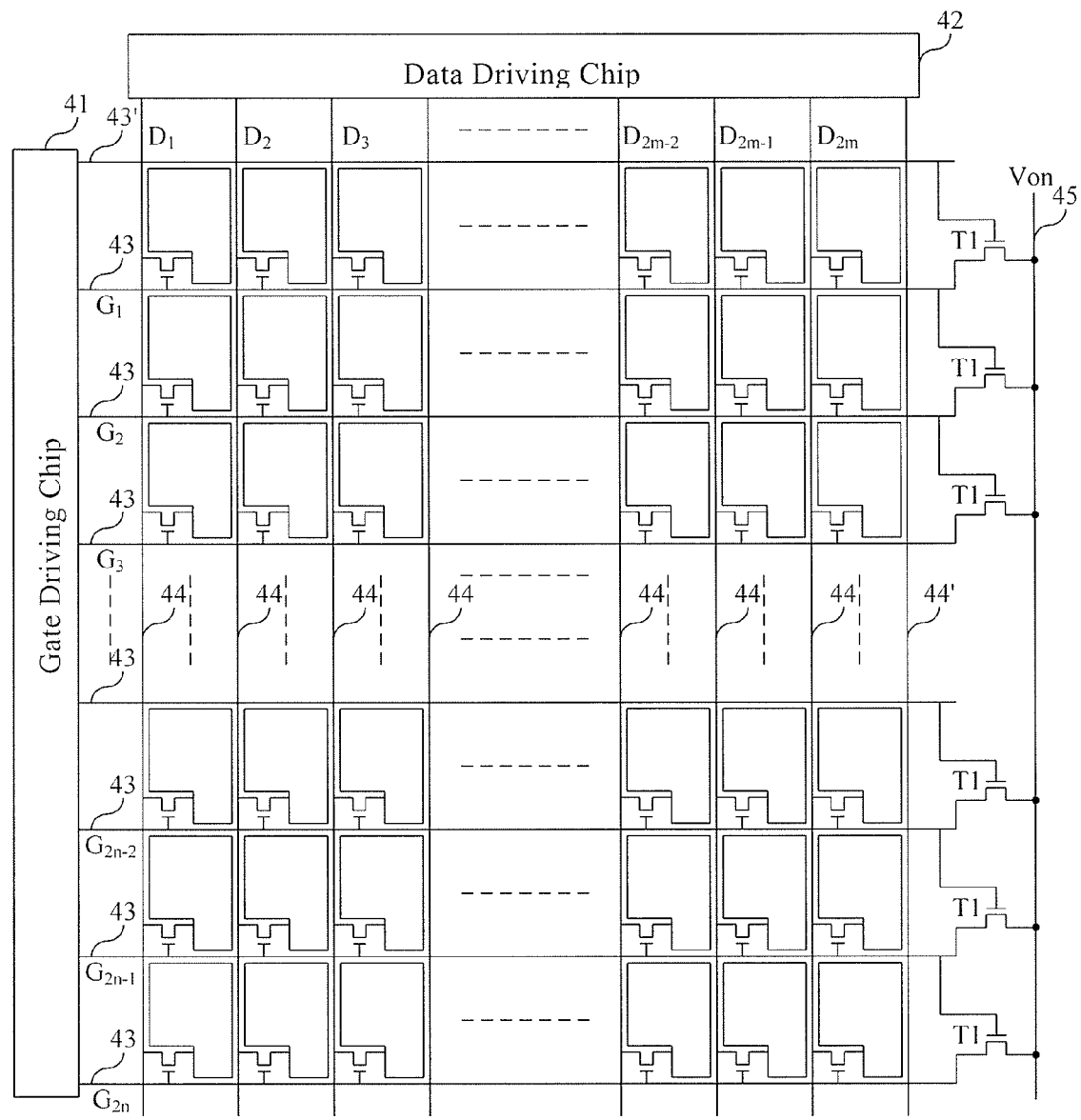
FIG. 4 is a schematic view showing the configuration of a first embodiment of the LCD driving device according to the invention.

FIG. 4 is a schematic view showing the configuration of a first embodiment of the LCD driving device according to the invention. As shown in FIG. 4, the LCD driving device comprises a scanning driving unit 41, a data driving unit 42, gate lines, data lines, and pixel regions defined by the intersecting between the gate lines and the data lines. The gate lines include gate scanning lines 43 (for convenience, the gate scanning lines 43 are numbered according to the scanning sequence) and a redundant gate line 43', and the data lines include data signal lines 44 and a redundant data line 44'. The LCD driving device further includes a compensation circuit that compensates the gate scanning signals of the gate scanning lines 43. The compensation circuit may comprise: a compensation signal line 45 and first transistors T1 that correspond to the respective gate scanning lines 43. Each of the first transistors T1 has its source electrode and drain electrode connected to, respectively, the end of the corresponding gate scanning line and the compensation signal line 45, and has its gate electrode connected to the end of the previous gate line (i.e., a gate scanning line 43 or the redundant gate line 43'). In particular, by taking gate scanning line $G_{2n}$ as an example, the source electrode of the last first thin film transistor T1 corresponding to line $G_{2n}$ as shown in FIG. 4 is connected to the end of line $G_{2n}$, the drain electrode is connected to the compensation signal line 45, and the gate electrode is connected to the end of the previous line $G_{2n-1}$. In this embodiment, the redundant gate line is regarded as the previous gate scanning line of the first gate scanning line.

The data driving unit 42 principally functions to supply data signals to the data signal lines 44 of the pixel regions; the scanning driving unit 41 principally functions to supply, row by row, gate scanning signals to the gate scanning lines 43 of the pixel regions; each pixel region is controlled by a thin film transistor, which is disposed at the intersection of the a corresponding gate scanning line 43 and a corresponding data signal line 44. When a gate scanning line 43 has a high level, the thin film transistors of the pixel regions in the corresponding row are switched on, the data signals over the data signal lines can be transferred to the respective pixels through the thin film transistors. For the sake of description, the columns or rows of the gate scanning lines 43 and the data signal lines 44 labeled in the drawings are only part of the columns or rows of the gate scanning lines 43 and the data signal lines 44, the inventions is not limited to that.

The gate electrode of the first thin film transistor T1 at row $2n$ is connected to the end of the gate scanning line 43 at row $2n-1$, the gate electrode of the first thin film transistor T1 at row $2n-1$ is connected to the end of the gate scanning line 43 at row $2n-2$ ... and so forth, the gate electrode of the first thin film transistor T1 at row 2 is connected to the end of the gate scanning line 43 at row 1, and the gate electrode of the first thin film transistor T1 at row 1 is connected to the end of the redundant gate line 43'. Such a structure can be used to compensate the gate scanning signals of the gate scanning lines 43 at the respective row $2n$, $2n-1$, ... 2, and 1. Here, the gate threshold voltage of the first thin film transistors T1 can be higher than that of the thin film transistors in the pixel regions, e.g., the gate threshold voltage of the first thin film transistors T1 can be the average of the high voltage Vgh of the gate scanning lines 43 and the low voltage of the gate scanning lines 43, i.e., (Vgh+Vgl)/2. The compensation voltage Von of the compensation signal line 45 for compensating the gate scanning lines is lower than the gate threshold voltage of the first thin film transistors, yet preferably as large as possible.

In particular, by taking the line $G_{2n}$ as the example under consideration, when the gate scanning line $G_{2n-1}$ is provided with the high level Vgh, the pixels at row $2n-1$ start to be charged; at this time, as the first thin film transistor T1 that is connected to the end of the gate scanning line $G_{2n}$ has its gate electrode connected to the end of the gate scanning line this first thin film transistor T1 is switched on, so that the compensation voltage Von over the compensation signal line 45 is transferred to the gate scanning line $G_{2n}$ at row $2n$ through the source electrode or drain electrode (not specified in the invention and depending on the actual connection) of the first thin film transistor connected to the gate scanning line $G_{2n}$, which subjects the gate scanning line to the compensation voltage Von. Subsequently, after the aforementioned scan to line when the gate scanning line is provided with the high voltage Vgh, i.e., the line $G_{2n}$ is scanned, as the gate scanning signal of the gate scanning line $G_{2n}$ at row $2n$ has already been subjected to Von in the previous scan, the gate scanning signal of the gate scanning line $G_{2n}$ can be readily changed to the high electrode level Vgh. This can reduce the adverse effect of the RC time delay on the ascending of the gate scanning signal, which assures enough charging time for the pixels, and thus guarantees their charging rate.

The LCD device of the embodiment can compensate gate scanning signals through connecting the first thin film transistors to the ends of respective gate scanning lines, which reduce the adverse effect of the RC time delay on the ascending of the gate scanning signals, which assures enough charging time of pixels and thus guarantees their charging rate.

Figure 5:
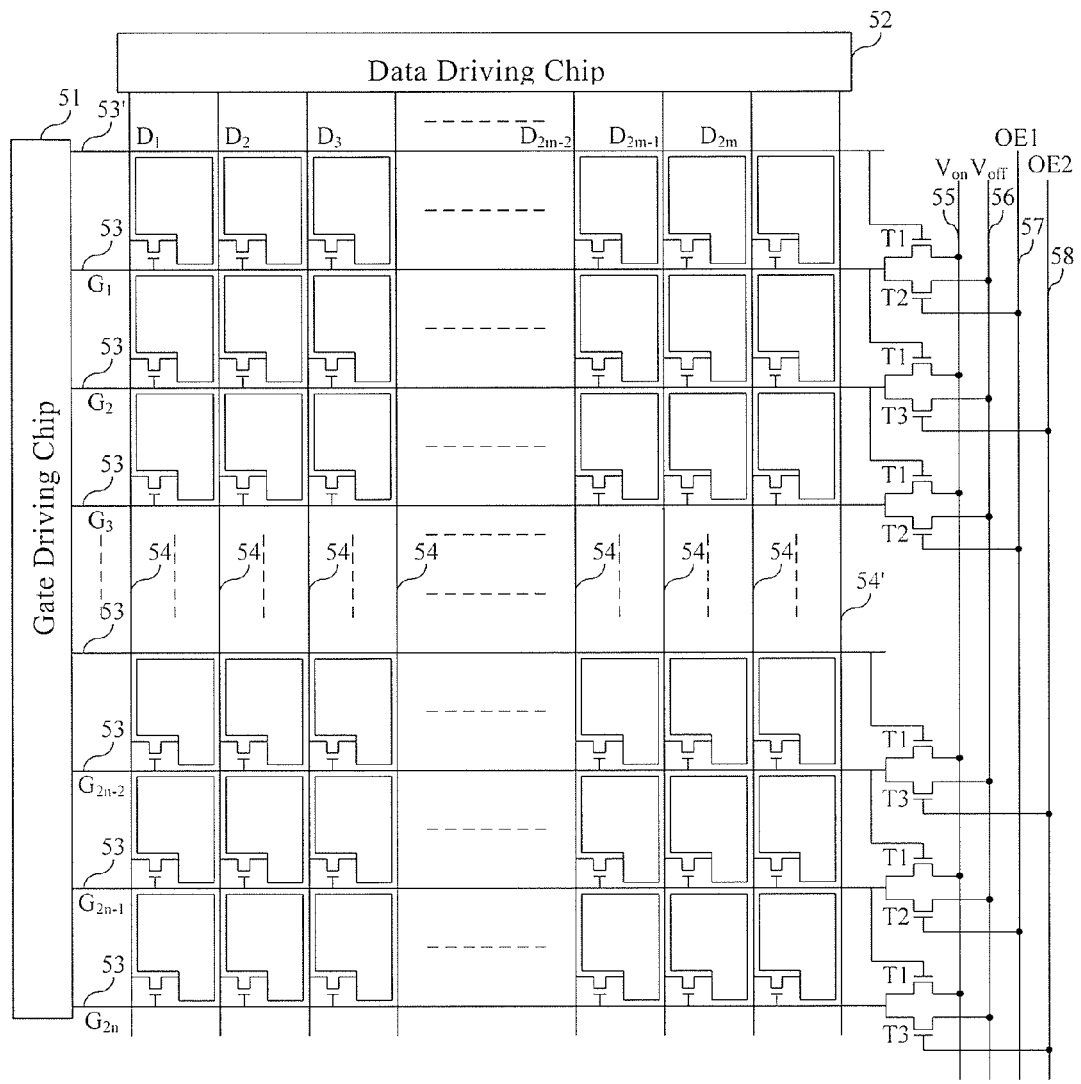
FIG. 5 is a schematic view showing the configuration of a second embodiment of the LCD driving device according to the invention.

FIG. 5 is a schematic view showing the configuration of a second embodiment of the LCD driving device according to the invention. As shown in FIG. 5, the LCD driving device comprises a scanning driving unit 51, a data driving unit 45, gate lines, data lines, and pixel regions defined by the gate lines and the data lines. The gate lines include gate scanning lines 53 (for convenience, the gate scanning lines 53 are numbered according to the scanning sequence) and a redundant gate line 53', and the data lines include data signal lines 54 and a redundant data line 54'. The LCD driving device further includes a compensation circuit that compensates the gate scanning signals of the gate scanning lines 53. The compensation circuit may comprise: a compensation line 55, a low-level signal line 56, a first switch control signal line 57, a second switch control signal line 58, first thin film transistors T1 that correspond to the respective gate scanning lines 53, second thin film transistors T2 that correspond to the respective odd-numbered gate scanning lines 53, and third thin film transistors T3 that correspond to the respective even-numbered gate scanning lines 53. Each of the first transistors T1 has its source electrode and drain electrode connected to, respectively, the end of the corresponding gate scanning line and the compensation signal line 55 and its gate electrode connected to the end of the previous gate line (i.e., a gate scanning line 53 or the redundant gate line 53'). Each of the second thin film transistors T2 has its source electrode and drain electrode connected to, respectively, the end of the corresponding $(2n-1)^{th}$ gate scanning line and the low-level signal line 56 and its gate electrode connected to the first switch control signal line 57, wherein the gate scanning lines are numbered according to the scanning sequence, and n is a positive integer. Each of the third thin film transistors T3 has its source electrode and drain electrode connected to, respectively, the end of the corresponding $(2n)^{th}$ gate scanning line and the low-level signal line 56 and its gate electrode connected to the second switch control signal line 58, wherein the gate scanning lines are numbered according to the scanning sequence, and n is a positive integer.

The gate electrode of the first thin film transistor T1 at row $2n$ is connected to the end of the gate scanning line 53 at row $2n-1$, the gate electrode of the first thin film transistor T1 at row $2n-1$ is connected to the end of the gate scanning line 53 at row $2n-2$ . . . and so forth, the gate electrode of the first thin film transistor T1 at row 2 is connected to the end of the gate scanning line 53 at row 1, and the gate electrode of the first thin film transistor T1 at row 1 is connected to the end of the redundant gate line 53'. Such a structure can be used to compensate the gate scanning signals of the gate scanning lines 53 of the respective row $2n, 2n-1, \ldots 2$, and 1. The gate threshold voltage of the first thin film transistors T1 can be higher than that of the thin film transistors in the pixel regions, e.g., the gate threshold voltage of the first thin film transistors T1 can be the average of the high voltage Vgh of the gate scanning line 53 and the low voltage of the gate scanning line 53, i.e., (Vgh+Vgl)/2. The compensation voltage Von of the compensation signal line 55 for compensating the gate scanning lines is lower than the gate threshold voltage of the first thin film transistors, yet preferably as large as possible. The voltage over the low-level signal line 56 is equal to the low voltage Vgl over the gate scanning line 53. The gate threshold voltage of the second thin film transistors T2 and that of the third thin film transistors T3 equals that of the thin film transistors in the pixel regions. The first switch control signal line 57 and the second switch control signal line 58 switch on, in alternation, the second thin film transistors T2 and the third thin film transistors T3.

Figure 6:
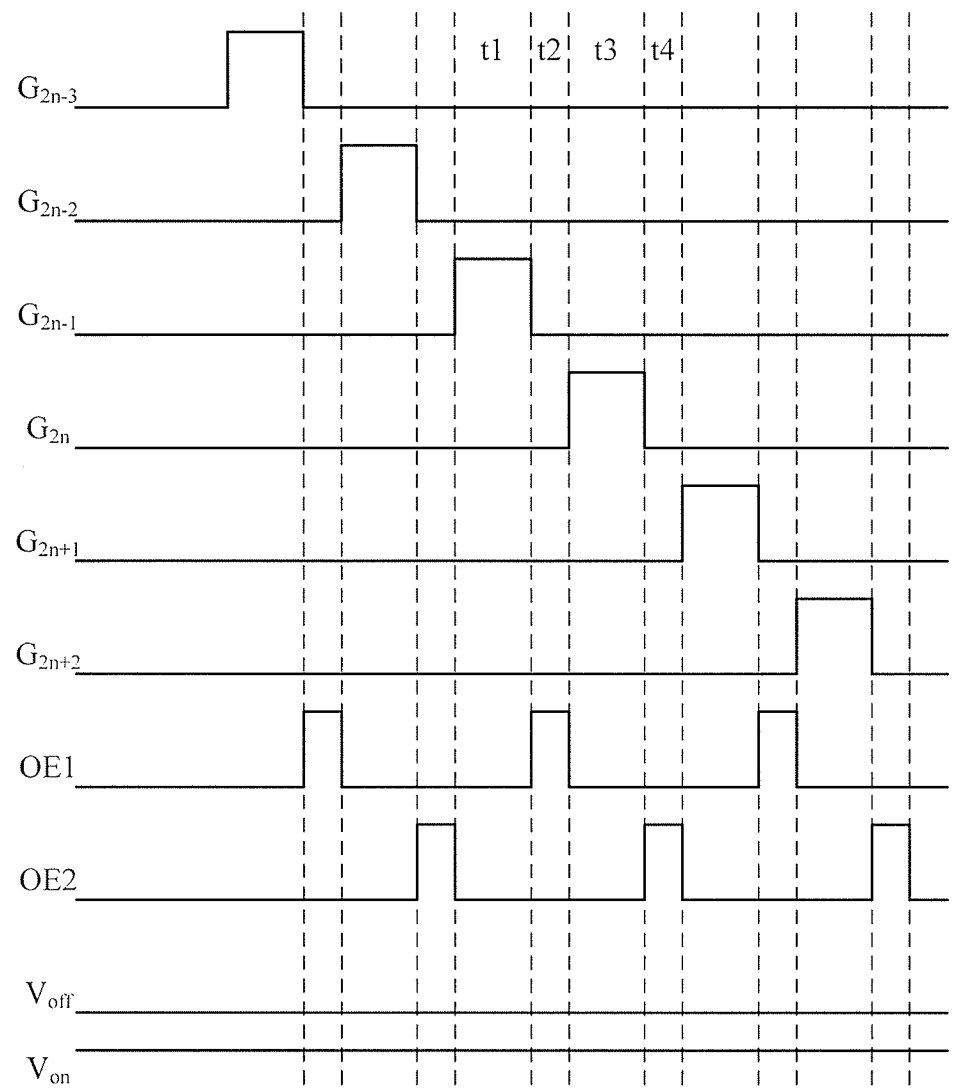
FIG. 6 is a schematic view showing the signal of the respective signal lines in the second embodiment.
Figure 7:
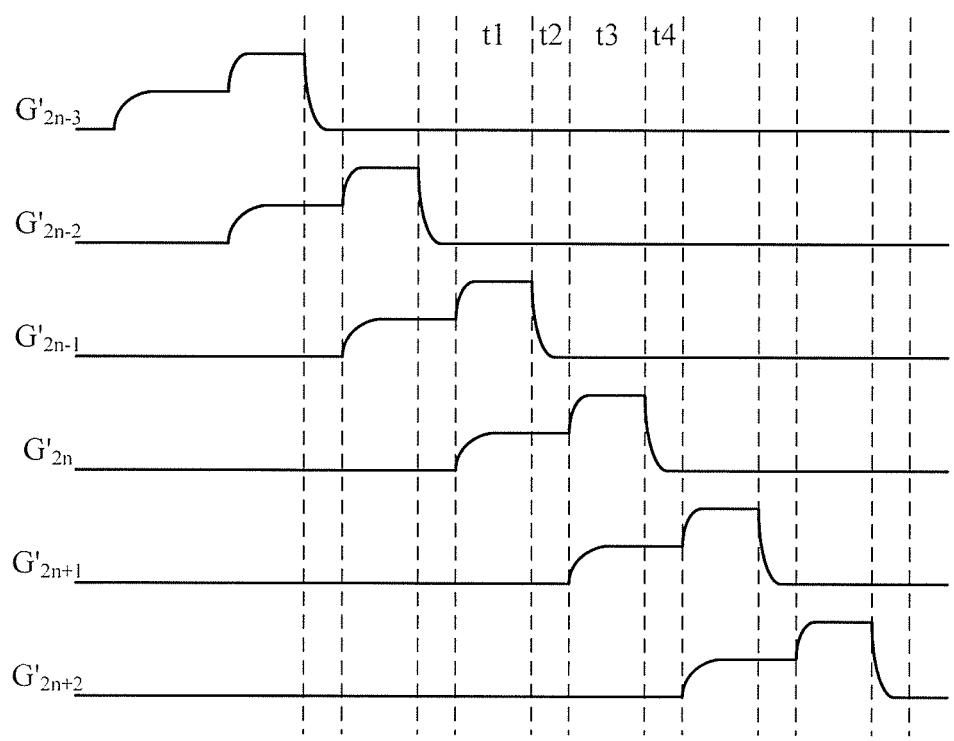
FIG. 7 is a schematic view showing the gate scanning signal outputted at the end of the gate scanning lines in the second embodiment.

FIG. 6 is a schematic view showing the signal of the signal lines in the second embodiment, FIG. 7 is a schematic view showing the gate scanning signal outputted at the end of the respective gate scanning lines in the second embodiment. With references to FIGS. 6 and 7, the detailed description is given below.

In the time interval t1, while the gate scanning signal at row $2n-1$ is at the high level Vgh, the pixels at row $2n-1$ start charging, and the first thin film transistor T1 at the end of the gate scanning line $G_{2n}$ at row $2n$ is switched on, so that the compensation voltage Von of the compensation line 55 is transferred to the gate scanning line $G_{2n}$ through the first thin film transistor T1 connected to the end of the gate scanning line $G_{2n}$ as shown by $G'_{2n}$ at the time interval t1 in FIG. 7.

In the time interval t2, the signal of the gate scanning signal $G_{2n-1}$ changes to the low level Vgl, at this time the signal OE1 of the first switch control signal line 57 is at the high level, which switches on all the second thin film transistors T2 corresponding to the odd-numbered gate scanning lines, i.e., the second thin film transistor T2 connected to the ends of the gate scanning line $G_{2n-1}$ is switched on. The source electrodes of the second thin film transistors T2 are connected to the low-level signal line 56 at the low level Voff, thus the low level Voff is transfer to the end of the gate scanning line $G_{2n-1}$. Because the low level Voff equals the low level Vgl at the beginning of the gate scanning line $G_{2n-1}$, the gate scanning signal of the gate scanning line $G_{2n-1}$ can be forced to the low level from two ends, as indicated by $G'_{2n-1}$ at the time interval t2 in FIG. 7. This reduced the delay of a gate scanning line's changing to the low level due to the RC time delay.

At this time, the gate electrode of the first thin film transistor T1 connected the end of the gate scanning line $G_{2n}$ at row $2n$ is connected to the gate scanning lines $G_{2n-1}$. When the gate scanning signal of the gate scanning line $G_{2n-1}$ is pulled down to the low level, the first thin film transistor T1 is closed, and the gate scanning line $G_{2n}$ has a voltage of Von, the magnitude of the compensation voltage Von is unable to switch on the first thin film transistor T1 connected to the end of the gate scanning line $G_{2n+1}$, as shown by $G'_{2n}$ at the time interval t1 in FIG. 7.

In the time interval t3, the signal of the first switch control signal line 57 changes to low level Vgl, the gate scanning signal of the gate scanning line $G_{2n}$ at row $2n$ changes to the high level Vgh. Since in the previous time interval t2, the gate scanning line $G_{2n}$ at row $2n$ has already been increased to Von, the voltage can be readily increased from Von to the high level Vgh, as shown by $G'_{2n}$ at the time interval t3 in FIG. 7. This reduces the adverse effect of the RC time delay on the ascending of the gate scanning signal, which assures enough charging time of pixels, and thus guarantees their charging rate. At the same time, the end of the gate scanning line $G_{2n}$ at row $2n$ is connected to the gate electrode of the first thin film transistor T1 that is connected to the next row, and thus the first thin film transistor whose source electrode or drain electrode is connected to the end of the gate scanning line $G_{2n+1}$ at row $2n+1$ is switched on, the compensation voltage Von of the compensation line 55 is transferred to the gate scanning line $G_{2n+1}$ through the first thin film transistor T1 connected to the end of the gate scanning line $G_{2n+1}$, as shown by $G'_{2n+1}$ at the time interval t3 in FIG. 7.

In the time interval t4, the signal of the gate scanning signal $G_{2n}$ changes to low level Vgl, at this time the signal OE2 of the second switch control signal line 58 is at the high level, which switches on all the third thin film transistors T3 corresponding to the even-numbered gate scanning lines, i.e., the third thin film transistor T3 connected to the gate scanning line $G_{2n}$ is switched on. The source electrodes of the third thin film transistors T3 are connected to the low-level signal line 56 at the low level Voff, and thus the low level Voff is transfer to the end of the line $G_{2n}$. Because the low level Voff equals the low level Vgl at the beginning of the gate scanning line $G_{2n}$, the gate scanning signal of the gate scanning line G7, can be forced to the low level from two ends, as indicated by $G'_{2n}$ of the time interval t4 in FIG. 7. This reduces the delay of a gate scanning line's changing to the low level due to the RC time delay.

The LCD device of the embodiment can compensate gate scanning signal through connecting first thin film transistors to the ends of respective gate scanning lines, which reduces the adverse effect of the RC time delay on the ascending and/or descending of the gate scanning signal, thus eliminates deficiencies such as unsatisfactory display effect and flickering caused by insufficient charging time of the pixels, improves the displaying quality, improves the uniformity of the gate scanning signal, and reduces the flickering of the displaying images caused by the RC time delay.

Figure 8:
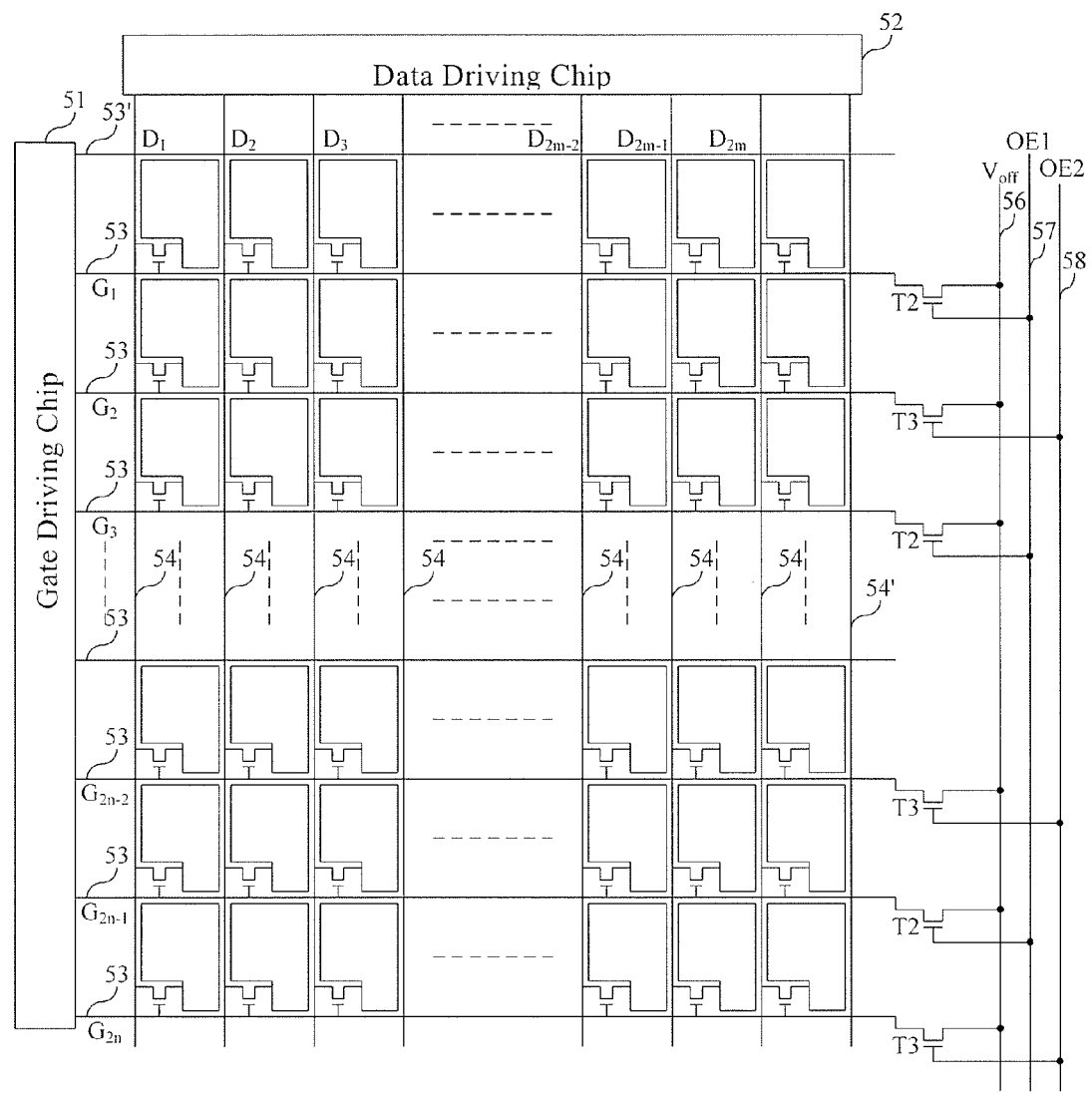
FIG. 8 is a schematic view showing the configuration of a third embodiment of the LCD driving device according to the invention.

In addition, FIG. 8 is a schematic view showing the configuration of a LCD driving device of the third embodiment according to the invention. As shown in FIG. 8, distinguishable from a LCD driving device of the second embodiment as shown in the above FIG. 5, the current embodiment comprises merely the second thin film transistors T2 and the third thin film transistors T3, it does not include the first thin film transistors. The way of connecting the second thin film transistors T2 and the third thin film transistors T3 and the mechanism of their operation are identical to those of the second embodiment as shown in FIG. 5; its description is, therefore, omitted. The LCD driving device of this embodiment reduces the delay of a gate scanning line's changing to the low level due to the RC time delay, which improves the quality of LCD displaying images.

Lastly, the aforementioned embodiments are employed to describe, not to limit, the technique of the invention. Notwithstanding that a detailed description is given with references to the embodiments as above, as one of ordinary skill in the art should understand, the technique embodied in the above embodiments can be modified, or some technical features can be substituted with the equivalents; such modifications or substitutions do not deviate the nature of the technique from the spirit and scope of the technique embodied in the embodiments according to the invention.

What is claimed is:

1. A liquid crystal display (LCD) driving device, comprising:
    a scanning driving unit;
    a data driving unit;
    gate lines;
    data lines;
    pixel regions defined by the gate lines and the data lines; and
    a compensation circuit connected to the gate lines,
    wherein the gate lines include gate scanning lines and a redundant gate line, the data lines includes data signal lines and a redundant data line, the compensation circuit is used to compensate gate scanning signals of the gate scanning lines, so as to reduce voltage delay over the gate scanning lines,
    wherein the compensation circuit comprises a compensation signal line and first thin film transistors that correspond to the respective gate scanning lines,
    wherein a source electrode and a drain electrode of each of the first thin film transistors are directly connected to, respectively, the corresponding gate scanning line and the compensation signal line, and a gate electrode of said each of the first thin film transistors is connected to an end of the previous gate scanning line immediately prior to the corresponding gate scanning line, and
    wherein the redundant gate line is regarded as the previous gate scanning line immediately prior to a first gate scanning line,
    wherein the compensation circuit further comprises:
    a low-level signal line;
    a first switch control signal line;
    a second switch control signal line;
    second thin film transistors that correspond to odd-numbered gate scanning lines; and
    third thin film transistors that correspond to even-numbered gate scanning lines,
    wherein each of the second thin film transistors has a source electrode and a drain electrode connected, respectively, to an end of the corresponding $(2n-1)^{th}$ gate scanning line and to the low-level signal line and each of the second thin film transistors has a gate electrode connected to the first switch control signal line, and each of the third thin film transistors has a source electrode and a drain electrode connected, respectively, to an end of the corresponding $(2n)^{th}$ gate scanning line and to the low-level signal line and each of the second thin film transistors has a gate electrode connected to the second switch control signal line, and
    wherein the gate scanning lines are numbered according to a scanning sequence and n is a positive integer.

2. The LCD driving device according to claim 1, wherein a gate threshold voltage level of the first thin film transistors is higher than a gate threshold voltage level of thin film transistors in the pixel regions.

3. The LCD driving device according to claim 2, wherein the gate threshold voltage level of the first thin film transistors is an average of a high voltage level of the gate scanning lines and a low voltage level of the gate scanning lines.

4. The LCD driving device according to claim 1, wherein a compensation voltage level over the compensation signal line is lower than a gate threshold voltage level of the first thin film transistors.

5. The LCD driving device according to claim 1, wherein a voltage level of a low level signal line equals a low voltage level of the gate scanning lines.

6. The LCD driving device according to claim 1, wherein a gate threshold voltage level of the second thin film transistors and a gate threshold voltage level of the third thin film transistors equal a gate threshold voltage level of thin film transistors in the pixel regions, respectively.

7. The LCD driving device according to claim 1, wherein the first switch control signal line and the second switch control signal line switch on, in alternation, the second thin film transistors and the third thin film transistors.

* * * * *